(12) United States Patent
Depondt

(10) Patent No.: US 9,718,444 B2
(45) Date of Patent: Aug. 1, 2017

(54) WIPER BLADE ADAPTER, IN PARTICULAR FOR A MOTOR VEHICLE WIPER DEVICE

(75) Inventor: Helmut Depondt, Kessel-Lo (BE)

(73) Assignee: Robert Bosch GmbH, Stuttgart (DE)

( * ) Notice: Subject to any disclaimer, the term of this patent is extended or adjusted under 35 U.S.C. 154(b) by 183 days.

(21) Appl. No.: 14/003,461

(22) PCT Filed: Jan. 9, 2012

(86) PCT No.: PCT/EP2012/050249
§ 371 (c)(1),
(2), (4) Date: Sep. 6, 2013

(87) PCT Pub. No.: WO2012/119796
PCT Pub. Date: Sep. 13, 2012

(65) Prior Publication Data
US 2013/0340194 A1    Dec. 26, 2013

(30) Foreign Application Priority Data

Mar. 7, 2011  (DE) .................. 10 2011 005 167

(51) Int. Cl.
*B60S 1/40*   (2006.01)
*B60S 1/38*   (2006.01)
(52) U.S. Cl.
CPC .............. *B60S 1/40* (2013.01); *B60S 1/386* (2013.01); *B60S 1/4003* (2013.01); *B60S 1/387* (2013.01);
(Continued)

(58) Field of Classification Search
CPC .... B60S 1/4003; B60S 1/4009; B60S 1/4045; B60S 1/4067; B60S 1/4077; B60S 1/387;
(Continued)

(56) References Cited

U.S. PATENT DOCUMENTS 3,871,050 A * 3/1975 Baut .................. B60S 1/4016
                                                    15/250.32
5,435,041 A * 7/1995 Ho .................... B60S 1/3801
                                                    15/250.201
(Continued)

FOREIGN PATENT DOCUMENTS

CN    1863698    11/2006
CN    101311043  11/2008
(Continued)

OTHER PUBLICATIONS

International Search Report for Application No. PCT/EP2012/050249 dated Mar. 19, 2012 (4 pages).

*Primary Examiner* — Gary Graham
(74) *Attorney, Agent, or Firm* — Michael Best & Friedrich LLP

(57) ABSTRACT

The invention relates to a wiper blade adapter, in particular for a motor vehicle wiper device, comprising a coupling unit (10) which comprises at least one first coupling element (12) and a second coupling element (14) which are provided for coupling at least two different types of wiper arm adapters (100, 110, 120, 130), and housing means (62) which are provided for delimiting at least one part of one of the coupling elements (12). According to the invention, said housing means (62) and the coupling element (12) are embodied such that they form one piece.

19 Claims, 9 Drawing Sheets

(52) U.S. Cl.
CPC .............. *B60S 1/407* (2013.01); *B60S 1/4016* (2013.01); *B60S 1/4048* (2013.01); *B60S 2001/4012* (2013.01)

(58) Field of Classification Search
CPC .... B60S 1/4006; B60S 1/4016; B60S 1/4019; B60S 2001/4012; B60S 2001/4035; B60S 2001/4029; B60S 2001/4032
See application file for complete search history.

(56) References Cited

U.S. PATENT DOCUMENTS

| | | | |
|---|---|---|---|
| 6,209,166 B1 * | 4/2001 | Westermann | B60S 1/4016 15/250.32 |
| 8,429,786 B2 * | 4/2013 | Van Baelen et al. | 15/250.32 |
| 8,505,151 B2 * | 8/2013 | Depondt et al. | 15/250.32 |
| 2004/0244137 A1 | 12/2004 | Poton | |
| 2010/0050360 A1 | 3/2010 | Chiang | |
| 2010/0050361 A1 | 3/2010 | Chang et al. | |
| 2010/0205763 A1 | 8/2010 | Ku | |
| 2011/0047742 A1 | 3/2011 | Kim et al. | |
| 2011/0277265 A1 * | 11/2011 | Ehde | 15/250.32 |

FOREIGN PATENT DOCUMENTS

| | | | |
|---|---|---|---|
| DE | 10347637 | | 5/2005 |
| DE | 10349637 A1 * | | 6/2005 |
| DE | 102009000483 | | 4/2010 |
| DE | 202010000197 | | 7/2010 |
| DE | 102009002764 | | 11/2010 |
| EP | 0141186 | | 5/1985 |
| EP | 1995130 | | 11/2008 |
| FR | 2205022 | * | 5/1974 |
| WO | WO2008/135308 A1 * | | 11/2008 |

* cited by examiner

WIPER BLADE ADAPTER, IN PARTICULAR FOR A MOTOR VEHICLE WIPER DEVICE

BACKGROUND OF THE INVENTION

Wiper blade adapters, comprising a coupling unit which comprises at least one first coupling element and a second coupling element, which are provided for coupling at least two different types of wiper arm adapters, and housing means which are provided for delimiting at least one part of one of the coupling elements towards the outside, are known from the area of motor vehicle wiper devices.

SUMMARY OF THE INVENTION

The invention relates to a wiper blade adapter, in particular for a motor vehicle wiper device, comprising a coupling unit which comprises at least one first coupling element and a second coupling element which are provided for coupling at least two different types of wiper arm adapters and housing means which are provided for delimiting at least one part of one of the coupling elements towards the outside.

According to the invention, the housing means and the first coupling element are embodied such that they form one piece, whereby a particularly stable mounting of a wiper arm adapter to the wiper blade adapter can be achieved and/or the use of further components for mounting the housing means can advantageously be omitted. By the term "coupling unit", a unit is particularly to be understood in this context which is provided to couple a wiper blade to a wiper arm. By the term "coupling element", an element is particularly to be understood in this context which is intended to provide a coupling region for coupling a wiper arm adapter. By the term "to couple", in particular to connect in a force-fitting and/or positive locking manner is to be understood in this context. "Different types of wiper arm adapters" refer in this case particularly to wiper arm adapter systems which differ in the design thereof and/or in the mounting function thereof. This preferably relates to differently standardized wiper arm adapter systems. A first type of wiper arm adapter refers in this case particularly to a wiper arm adapter which has a mounting pin and a support plate. A further possible type of wiper arm adapter refers in this context particularly to a wiper arm adapter which comprises an elongated, hook-shaped base body having a bend of 180°. A further possible type of wiper arm adapter refers in this context particularly to a wiper arm adapter which has two rear stops and a mounting lug. A further possible type of wiper arm adapter refers in this context particularly to a wiper arm adapter which comprises a mounting recess and a base body having an s-shaped profile. A further possible type of wiper arm adapter relates in this context particularly to a wiper arm adapter which has a mounting recess and walls comprising mounting means. The term "provided" refers particularly to specially designed or specially equipped. Housing means relate in this context particularly to means which at least in a mounted state form a substantially visible outer surface and provide a receiving region for the wiper arm adapter unit. "Substantially visible" refers in this context particularly to being recognizable at a glance. The housing means preferably encloses at least partially other components. "Forming one piece" relates particularly to being connected in a materially bonded manner, as, for example, by means of a welding process and/or adhesively bonding process etc. and particularly advantageously to being integrally formed with another component as by means of being manufactured from a single mold and/or being manufactured in a single component or multi-component injection molding procedure. A "wiper arm adapter" relates in this case particularly to an adapter which has a contact region with a wiper arm component and is permanently connected to said wiper arm component and is therefore intended for the purpose of providing a coupling region of the wiper arm component for coupling and/or contacting with the wiper blade adapter.

The invention further proposes that the first and the second coupling element are formed by separate components, whereby the wiper blade adapter can be particularly simply adapted for a coupling with different types of wiper arm adapters. "Separate components" refers particularly in this context to components which are mutually free of materially bonded connections.

If the first and the second coupling element are designed so as to be detachable from one another, the wiper blade adapter can be adapted in a particularly simple manner for a coupling with different types of wiper blade adapters. "Detachable" refers in this case particularly to "capable of being separated without incurring damage". In a particularly advantageous manner, the wiper blade adapter can be detached and/or mounted without the use of tools.

If the wiper device comprises a detent unit which is provided to connect the first coupling element to the second coupling element via a detent connection, a connection of the first to the second coupling element can take place quickly and reliably. A "detent unit" relates in this case particularly to a unit which is provided to produce a detent connection between two components.

According to a further embodiment of the invention, at least one of the coupling elements has at least one longitudinal guide element which is provided to guide a wiper arm during mounting, whereby a reliable coupling of the wiper blade adapter to a wiper arm can be achieved. A "longitudinal guide element" refers in this context particularly to an element which is provided to guide a component in a longitudinal direction. The term "longitudinal direction" refers in this context to a direction which runs parallel to a main longitudinal extension of an element. By the term "main longitudinal extension", particularly a largest possible extension is understood in this context. "Extension" of an element refers in this case particularly to a maximum distance between two points of a vertical projection of the element onto a plane.

The invention furthermore proposes that at least one of the coupling elements has at least one detent means which is provided to limit the freedom of movement of a wiper arm adapter in an assembled state, whereby a simple and quick coupling to a wiper arm adapter can be achieved. The term "detent means" relates in this context particularly to a resilient means for producing a detent connection, said resilient means being provided to be resiliently deflected during an assembly procedure.

The invention further proposes that at least one of the detent means can be deflected transversely to a longitudinal direction of one of the coupling elements. In so doing, a particularly compact design of the wiper blade adapter can be achieved.

According to a further embodiment of the invention, the coupling unit is provided for receiving a wiper arm adapter which has an elongated, hook-shaped base body having a bend of 180°. As a result, a particularly reliable mounting of the wiper arm adapter within the coupling unit can be achieved.

The invention further proposes that the first coupling element can be mounted to a wiper blade adapter plate. As a result, the wiper blade adapter plate can be mounted to the wiper blade adapter in a simple manner. A "wiper blade adapter plate" relates in this context particularly to a body, which forms at least one contact region with a wiper blade and is provided for coupling or contacting to a wiper blade adapter.

BRIEF DESCRIPTION OF THE DRAWINGS

Further advantages ensue from the following description of the drawings. An exemplary embodiment of the invention is depicted in the drawings. The drawings, the description and the claims contain numerous features in combination. The person skilled in the art will expediently consider the features individually and put them together to form further useful combinations.

In the drawings.

DETAILED DESCRIPTION

Figure 1:
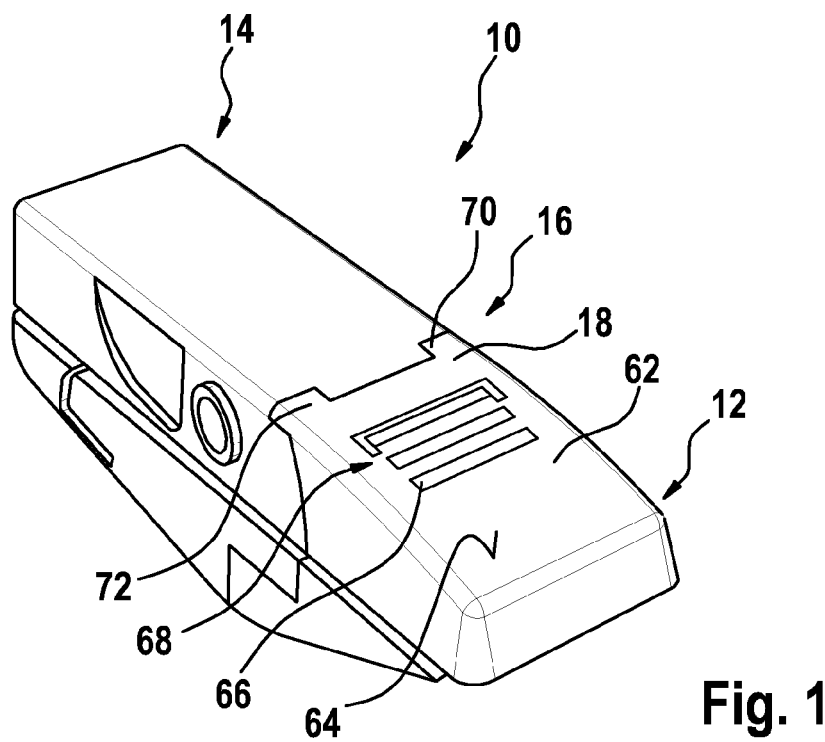
FIG. 1 shows a perspective view of a wiper blade adapter according to the invention.

FIG. 1 shows a wiper blade adapter according to the invention comprising a coupling unit 10 which has a first coupling element 12 and a second coupling element 14. The first coupling element 12 and the second coupling element 14 are formed from separate components. The coupling elements 12, 14 are connected in a positive-locking manner.

The wiper blade adapter contains a detent unit 16 which is provided to connect the first coupling element 12 to the second coupling element 14 via a detent connection. For this purpose, the first coupling element 12 comprises a detent means 18 which is disposed at a free end of said first coupling element 12. The detent means 18 can be resiliently deflected from a starting position and automatically moves back into the starting position after having been deflected. The first and second coupling element 12, 14 are designed to be detached from one another, i.e. to be capable of being separated from one another without incurring damage, by means of the detent unit 16. In the depicted assembled state, the detent means 18 forms a positive-locking connection with the second coupling element 14.

Figure 2:
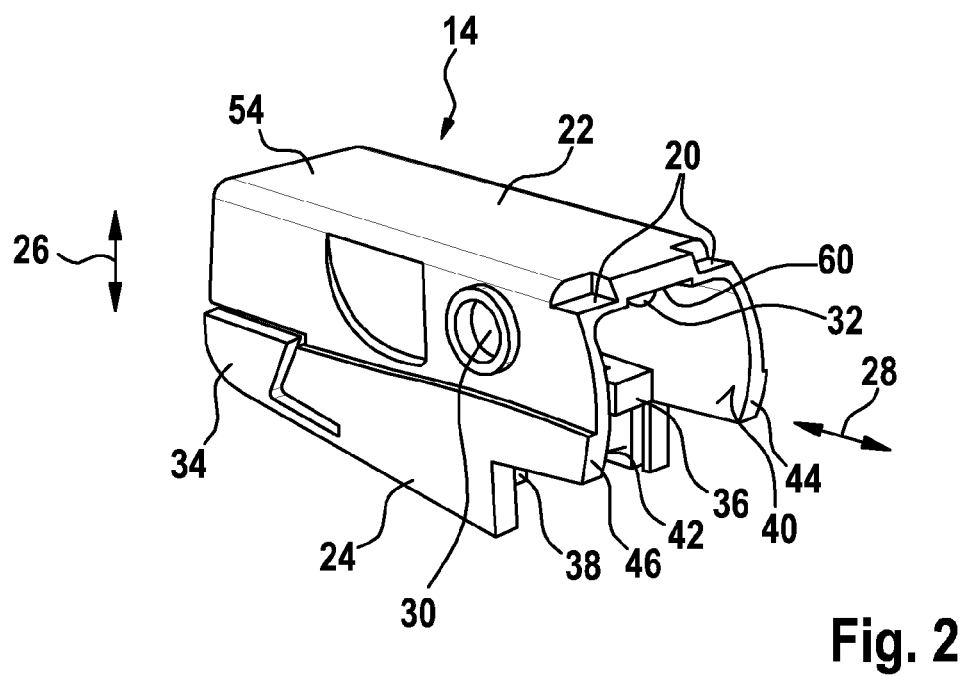
FIG. 2 shows a perspective view of a coupling element of the wiper blade adapter pursuant to FIG. 1.

In so doing, the detent means 18 engages into two detent recesses 20 of the second coupling element 14 (FIG. 2). The detent recesses 20 are disposed under a covering means 22 of the coupling element 14. The covering means 14 is integrally designed with a base body 24 of the second coupling element 14 and delimits said coupling element in a vertical direction 26. The vertical direction 26 extends perpendicularly to a longitudinal direction 28 which runs parallel to a main longitudinal extension of the second coupling element 14.

The second coupling element 14 has two circular mounting recesses 30, 32 which are disposed in the base body 24. The mounting recesses 30, 32 are provided to connect said second coupling element 14 to a wiper arm adapter in a positive-locking manner. Said second coupling element 14 furthermore comprises a detent means 34 which is disposed at a free end of the base body 24. Two vertical guide elements 36, 38 of the second coupling element 14 are integrally formed with the base body 24. The vertical guide elements 36, 38 adjoin inner surfaces 40, 42 of side walls 44, 46 of the second coupling element 14. The side walls 44, 46 are designed as one piece with the covering means 22 and form together with the same housing means 54. The housing means 54 delimit a part of the second coupling element 14 towards the outside. The housing means 54 thereby form a longitudinal guide element 60 of the second coupling element 14, which is provided to guide a wiper arm during assembly.

Figure 3:
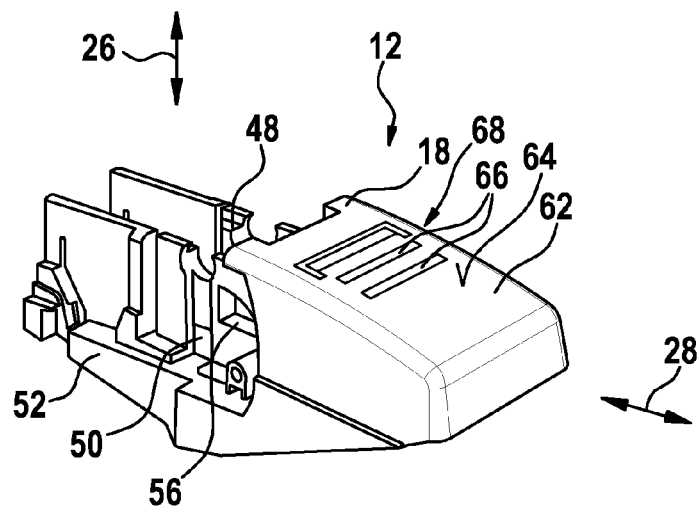
FIG. 3 shows a further perspective view of a coupling element of the wiper blade adapter pursuant to FIG. 1.

In order to receive the vertical guide elements 36, 38, the first coupling element 12 has two vertical guide rails 48, 50 which are formed from a base body 52 (FIG. 3). In order to produce a detent connection between the first coupling element 12 and the second coupling element 14, the second coupling element 14 is placed in the vertical direction onto the first coupling element 12. As a result, the vertical guide elements 36, 38 engage into the vertical guide rails 48, 50 and prevent a movement of said first coupling element 12 relative to said second coupling element 14 in each direction deviating from the vertical direction 26. By pushing said first coupling element 12 onto the second coupling element 14, the detent means 18 is deflected in the longitudinal direction 28. In an end position, the detent means 18 snaps back and forms a positive-locking connection with the detent recesses 20. A movement of said first coupling element 12 relative to the second coupling element 14 in the vertical direction 26 is thereby prevented. In order to release the detent connection, the detent means 18 is deflected and said second coupling element 14 is pushed out of the vertical guide rails 48, 50.

When coupling the wiper blade adapter to the wiper arm adapter, the second coupling element 14 has to be either removed or mounted depending on the type of wiper arm adapter being used.

The first coupling element 12 has a further detent means 56 for coupling to a wiper arm adapter of another type. The detent means 56 is disposed on the base body 52 and is connected to the same so as to form one piece. When coupling a corresponding wiper arm adapter, the detent means 56 is deflected out of a starting position transversely to the longitudinal direction 28 and transversely to the vertical direction 26 and finally moves back again into said starting position. The wiper blade adapter furthermore has housing means 62 which delimit a part of the coupling element 12 towards the outside. The housing means 62 and the first coupling element 12 are embodied such that they form one piece. Said housing means 62 have three recesses 66, which have in each case a rectangular contour, on an outwardly facing upper side 64 thereof. Together with said housing means 62, the recesses 66 form an operating element 68. By exerting pressure on the operating surface, the housing means 62 are elastically deflected out of a starting position. The detent means 18 is formed integrally with the housing means 62. Said detent means is therefore deflected when the housing means 62 are deflected. The detent means 18 comprises two detent lugs 70, 72 which are integrally molded as extensions on the housing means 62.

Figure 4:
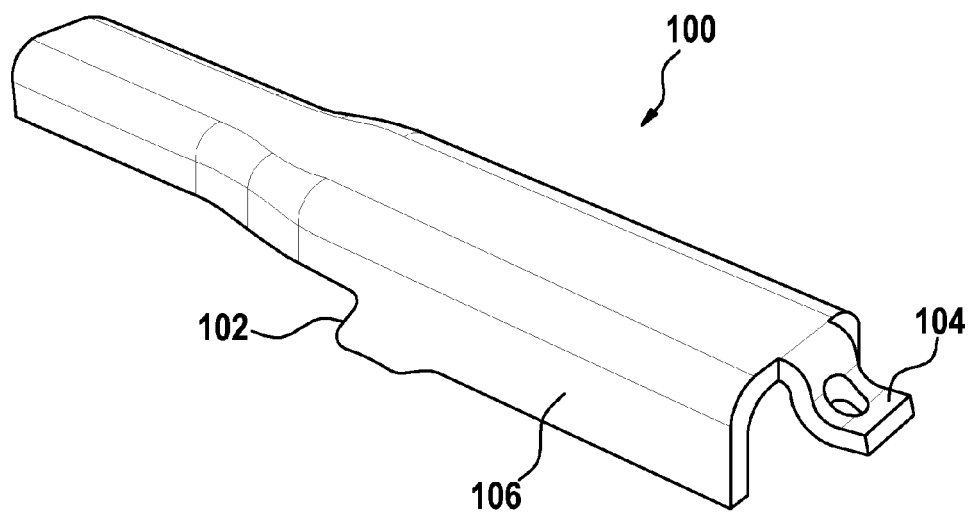
FIG. 4 shows a perspective view of a type of wiper arm adapter.

FIG. 4 shows a perspective view of a wiper arm adapter 100 which is provided for coupling with the wiper blade adapter. The wiper arm adapter 100 has two rear stops 102 and a mounting lug 104. The rear stops 102 close flush with the side walls 106 of the wiper arm adapter 100. The mounting lug 104 is formed as an extension at a free end of the wiper arm adapter 100.

Figure 5A:
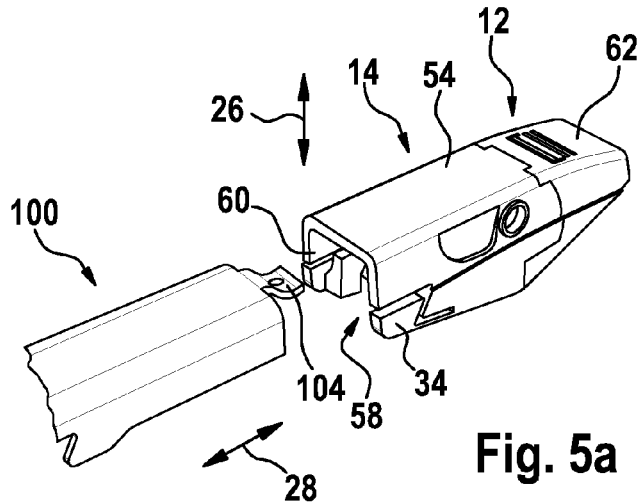
FIGS. 5a to 5c show a perspective view of the wiper blade adapter pursuant to FIG. 1 and the wiper arm adapter pursuant to FIG. 4 in an assembly process.

In FIG. 5*a*, a perspective view of a first assembly step of a coupling of the wiper arm adapter 100 to the wiper blade adapter is shown. As viewed in the longitudinal direction 28, the wiper arm adapter 100 is disposed in front of the wiper blade adapter. The mounting lug 104 is inserted into a receiving area 58 of the first coupling element 12.

Figure 5B:
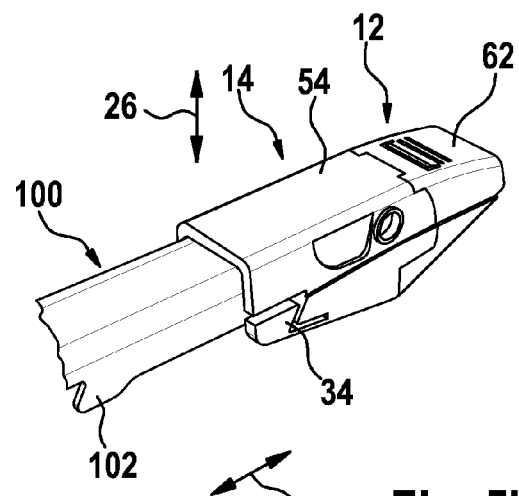
Figure 5C:
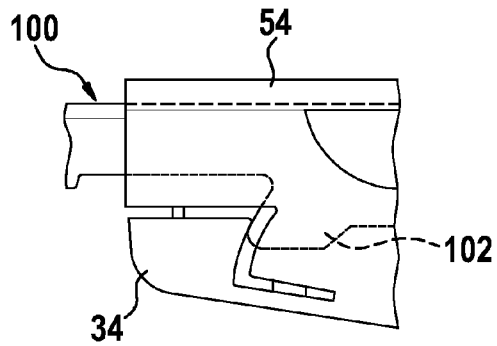

The wiper arm adapter 100 is inserted further into the housing means 54 and is guided by the longitudinal guide element 60 of the second coupling element 14 (FIG. 5*b*). Finally the detent means 34 of the second coupling element 14 is deflected in the vertical direction 26 out of the starting position thereof by the rear stops 102. If the wiper arm adapter 100 is completely inserted into the housing means 54, the detent means 34 springs back into the starting position thereof and prevents said wiper arm adapter 100 from being pushed back out of the assembled state (FIG. 5*c*). As a result, said wiper arm adapter 100 is limited in the freedom of movement thereof.

Figure 6:
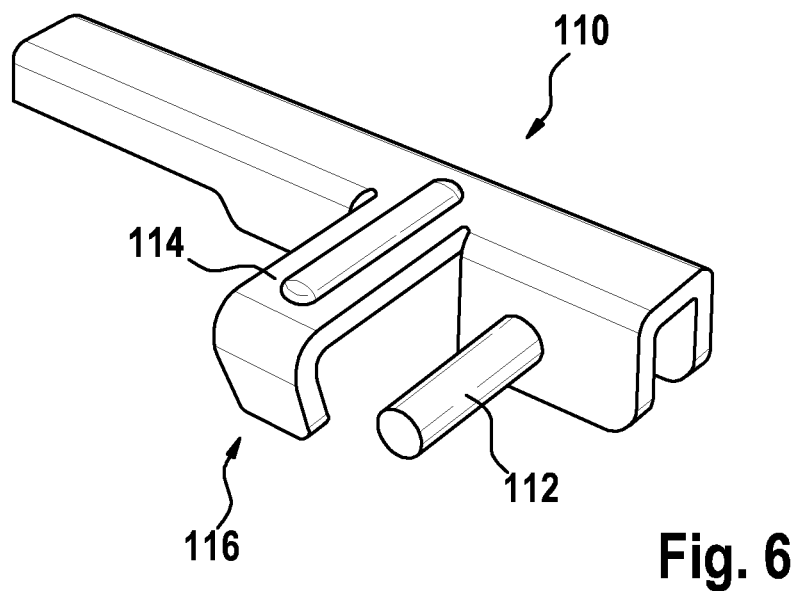
FIG. 6 shows a perspective view of a further type of wiper arm adapter.

A perspective view of a further type of wiper arm adapter 110 is shown in FIG. 6. The wiper arm adapter 110 has a mounting pin 112. Said wiper arm adapter 110 further comprises a support plate 114, which extends parallel to the mounting pin 112 in the main extension thereof. The support plate 114 bends about an angle of 90° in an end region 116.

Figure 7A:
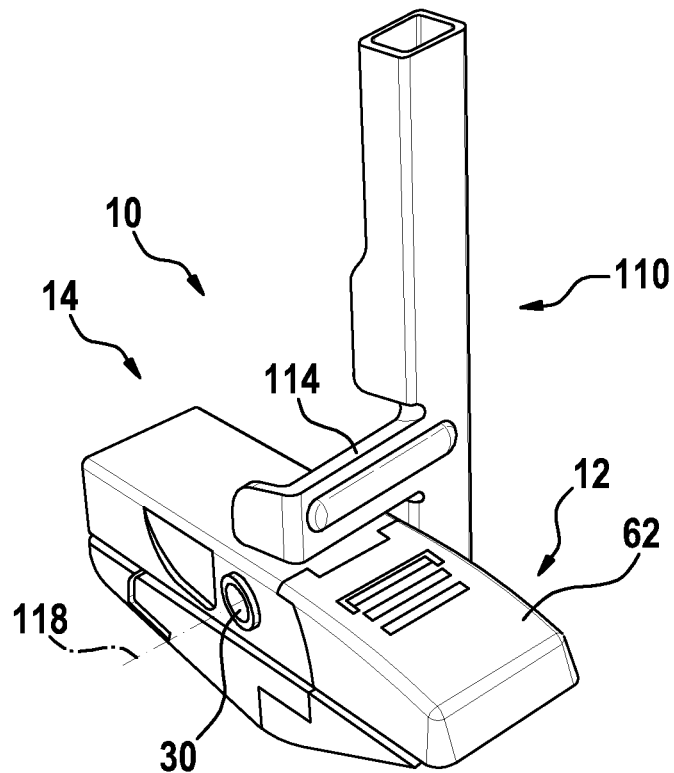
FIGS. 7a and 7b show a perspective view of the wiper blade adapter pursuant to FIG. 1 and the wiper arm adapter pursuant to FIG. 6 in an assembly process.
Figure 7B:
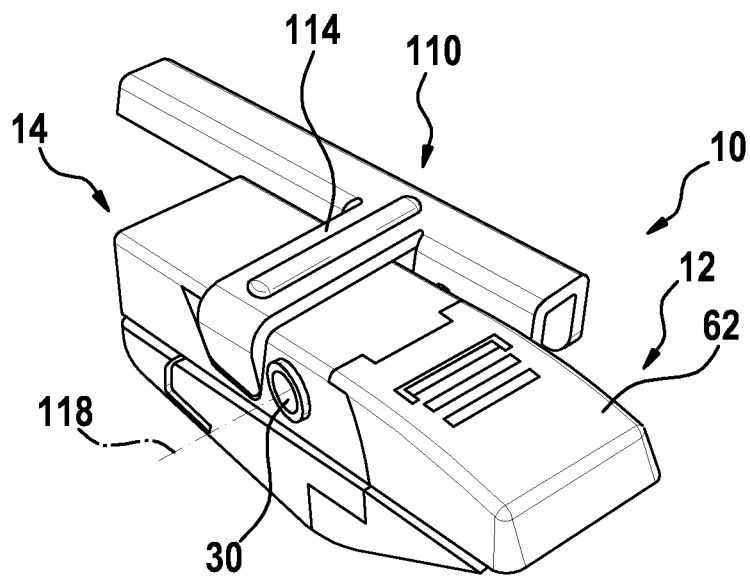

In FIG. 7*a*, a perspective view of a first assembly step of a coupling of the wiper arm adapter 110 to the wiper blade adapter is shown. The mounting pint 12 is inserted into the mounting recesses 30 and forms a positive-locking connection with the same. By rotating the wiper arm adapter 110 relative to the coupling unit 10 about an axis of rotation 118, a portion of the support plate 114 engages behind the second coupling element 14 and thereby prevents the wiper arm adapter 110 from being pushed back (FIG. 7*b*).

Figure 8:
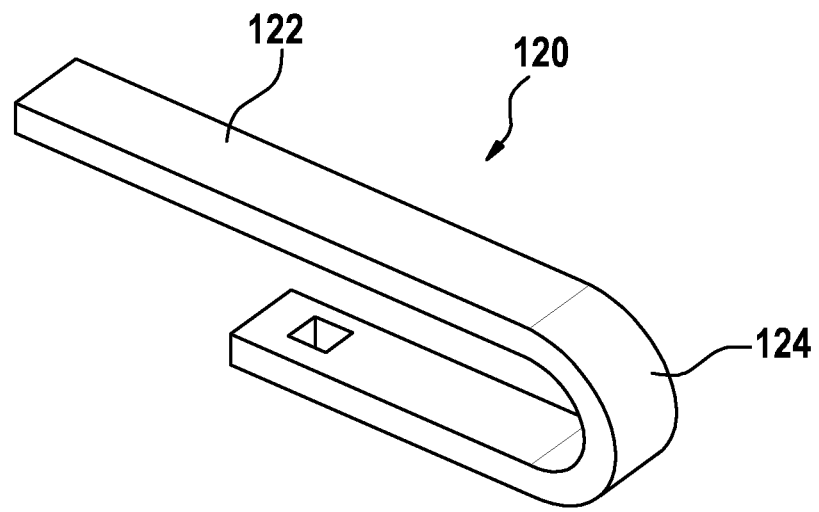
FIG. 8 shows a perspective view of a further type of wiper arm adapter.

FIG. 8 shows a wiper arm adapter 120 which comprises an elongated base body 122. The base body 122 has a bend 124, which includes an angle of 180°.

Figure 9A:
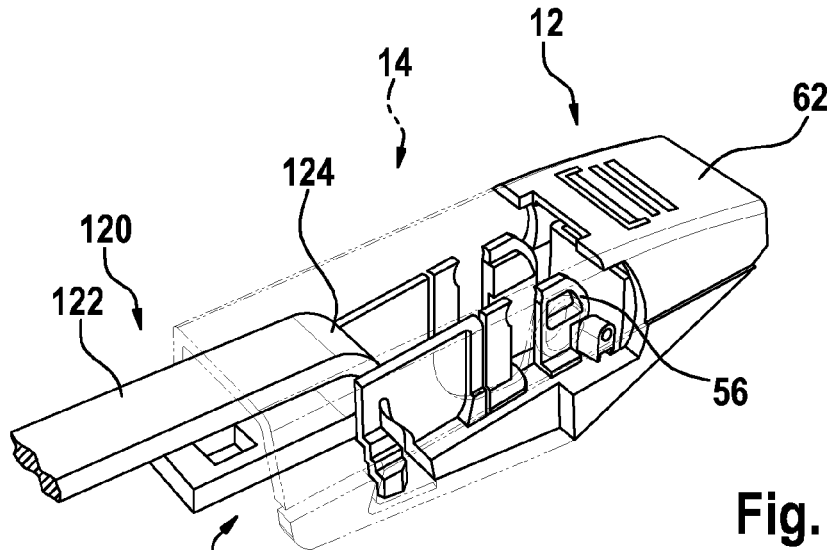
FIGS. 9a to 9c show a perspective view of the wiper blade adapter pursuant to FIG. 1 and the wiper arm adapter pursuant to FIG. 8 in an assembly process.
Figure 9B:
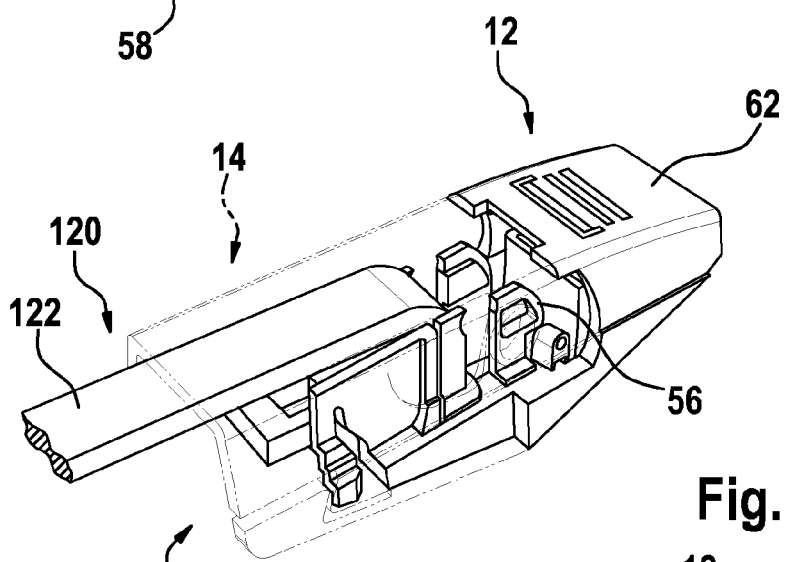
Figure 9C:
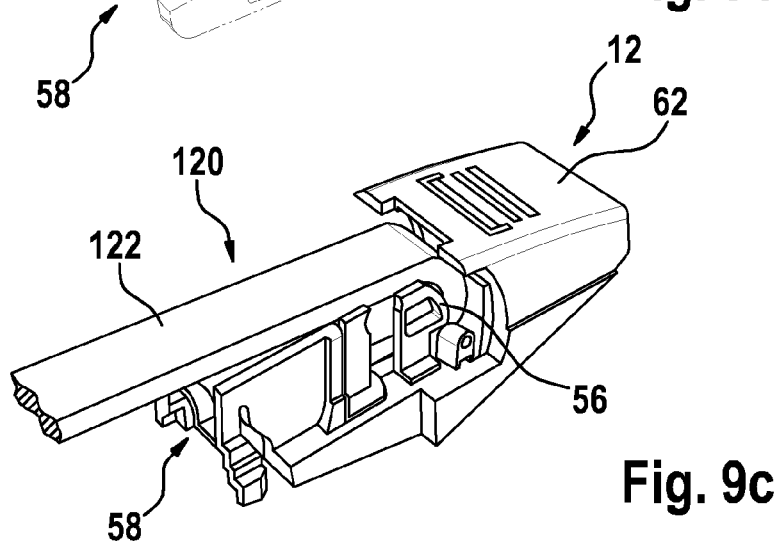

In FIG. 9*a*, a perspective view of a first assembly step of a coupling of the wiper arm adapter 120 to the wiper blade adapter is shown. The wiper arm adapter 120 is inserted in the region of the bend 124 thereof into the receiving area 58 of the first coupling element 12. The second coupling element 14 is connected to the first coupling element 12 and partially protects the wiper arm adapter 120 from outside influences. By inserting said wiper arm adapter 120 further into the receiving area 58, the detent means 56 is deflected (FIG. 9*b*). FIG. 9 shows the wiper arm adapter 120 and the wiper blade adapter in an assembled state. For reasons of clarity, the second coupling element 14 is not depicted. The detent means 56 engages behind the base body 122 of the wiper arm adapter 120 in the region of the bend 124. In so doing, the wiper arm adapter 120 is reliably coupled to the wiper blade adapter.

Figure 10:
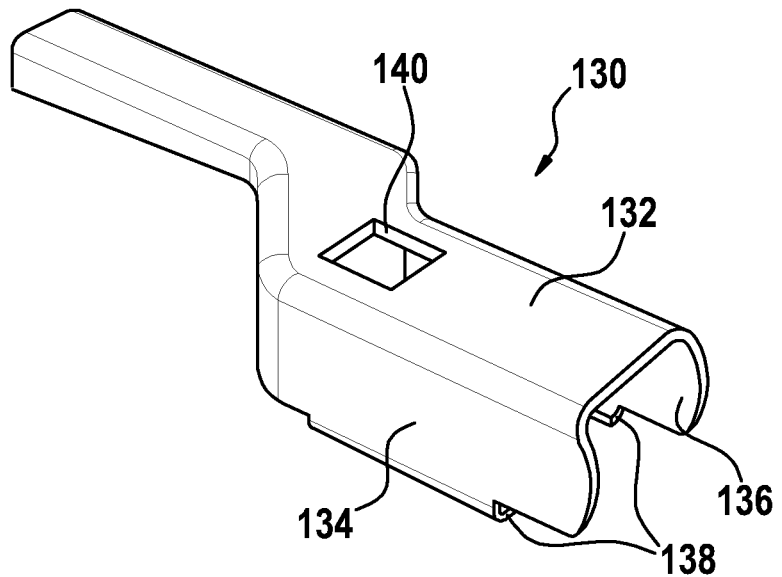
FIG. 10 shows a perspective view of a further type of wiper arm adapter.

A further type of wiper arm adapter 130 is depicted using a perspective view in FIG. 10. The wiper arm adapter 130 has a base wall 132, at which two side walls 134, 136 are disposed. The side walls 134, 136 enclose in each case with the base wall 132 an angle of 90°. Mounting means 138 are disposed at a lower end of the respective side wall 134, 136, which in turn enclose an angle of 90° with respect to the side walls 134, 136. A mounting recess 140 is additionally disposed in the base wall 132 of the wiper arm adapter 130.

Figure 11A:
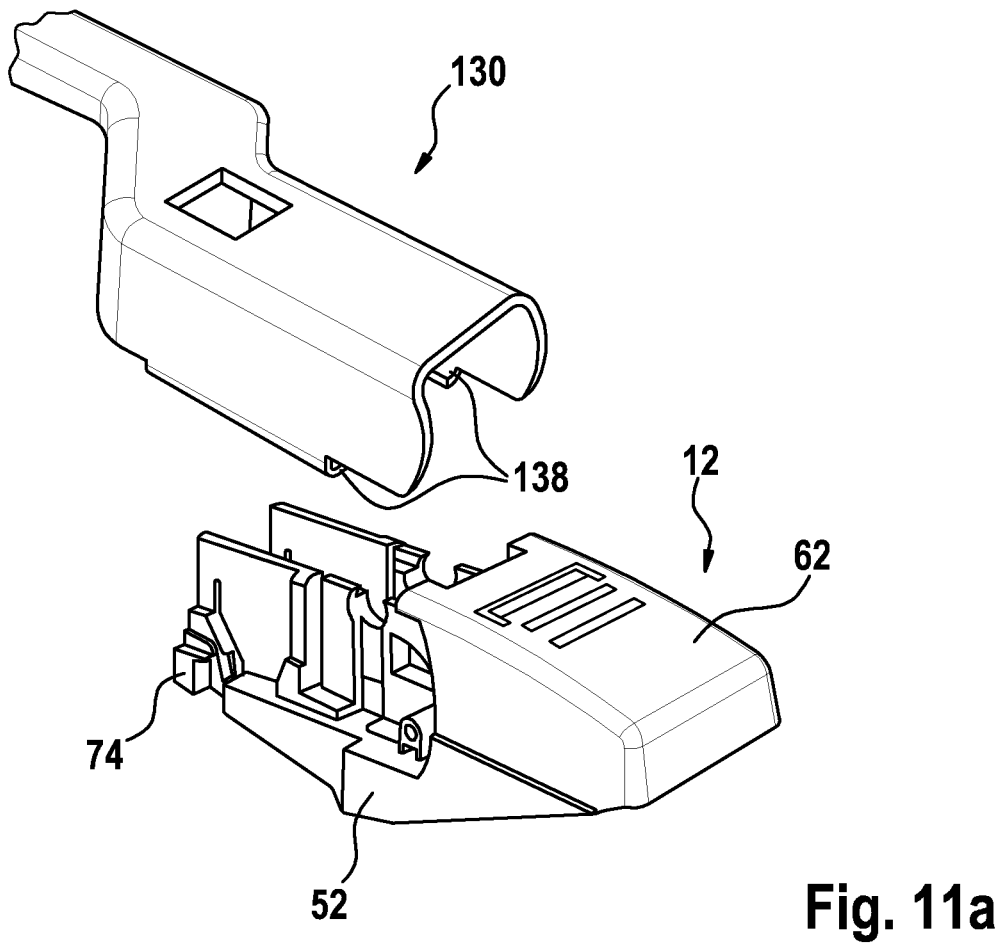
FIGS. 11a and 11b show a perspective view of the wiper blade adapter pursuant to FIG. 1 and the wiper arm adapter pursuant to FIG. 10 in an assembly process.

The second coupling element 14 is removed for assembly of the wiper arm adapter 130 (FIG. 11*a*). The housing means 62 are resiliently deflected relative to the base body 52 out of a starting position. When placing the wiper arm adapter 130 onto the first coupling element 12, a detent means 74 disposed on the base body 52 is deflected out of a starting position.

Figure 11B:
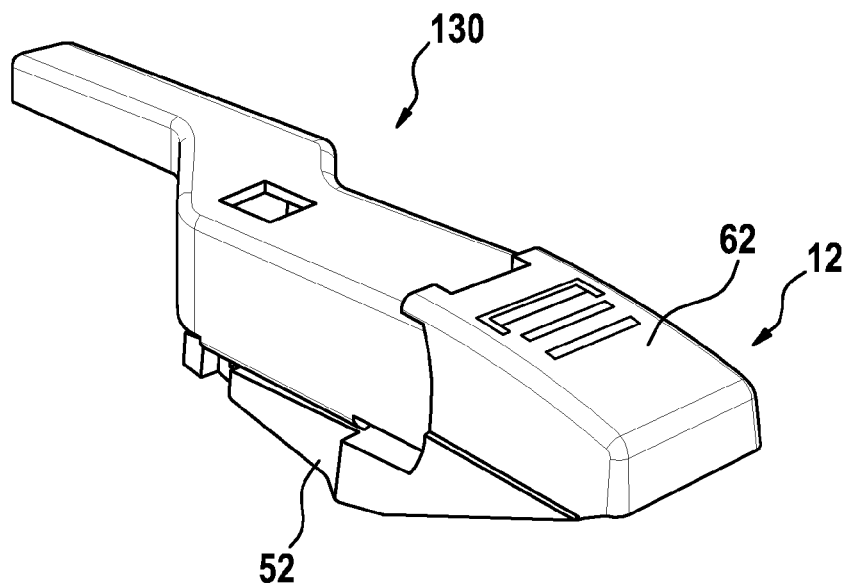

If the wiper arm adapter 130 is placed completely on the first coupling element 12, the detent means 74 is moved back into the starting position thereof and then forms a positive-locking connection with the wiper arm adapter 130, said positive-locking connection preventing a movement of the wiper arm adapter 130 back out of the assembled state (FIG. 11*b*).

Figure 12:
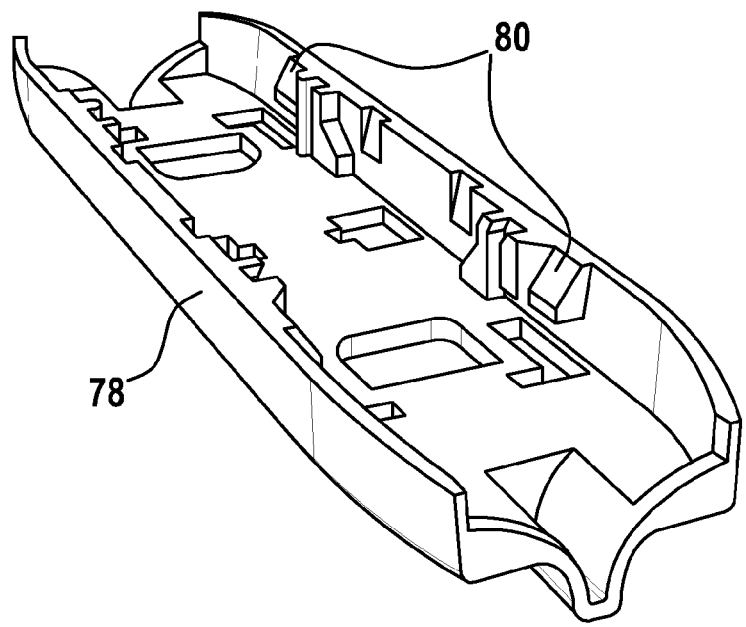
FIG. 12 shows a perspective view of an adapter plate of the wiper blade adapter pursuant to FIG. 1.
Figure 13:
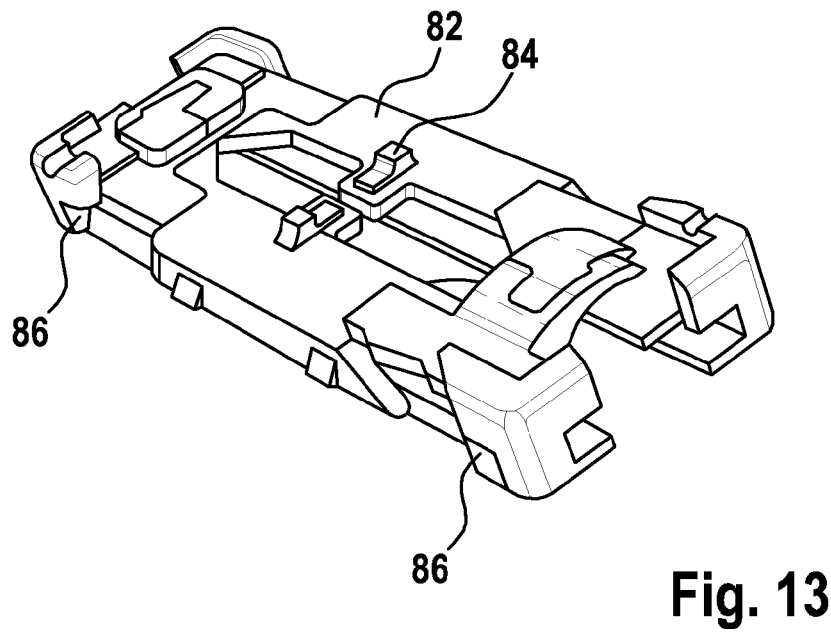
FIG. 13 shows a perspective view of a base adapter of the wiper blade adapter pursuant to FIG. 1
Figure 14:
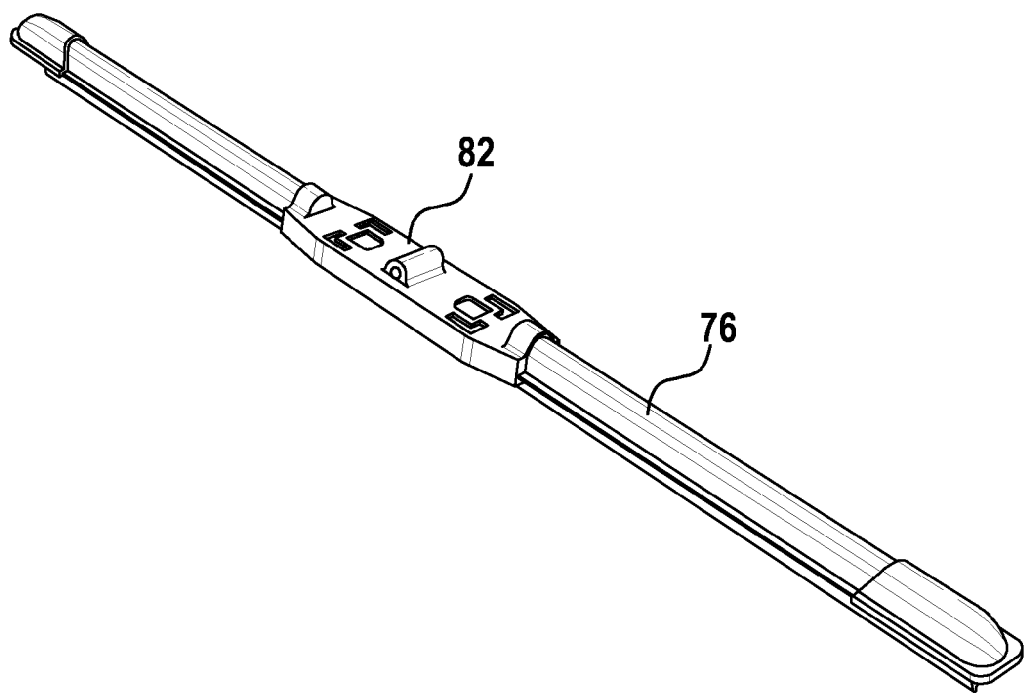
FIG. 14 shows a perspective view of the base adapter pursuant to FIG. 11 and a wiper blade in an assembled state.

The first coupling element 12 can be mounted via a pin (not depicted) to a wiper blade adapter plate 78. The wiper blade adapter plate 78 has detent means 80 on a bottom side thereof (FIG. 12), said detent means forming a positive-locking connection with a base adapter 82 in an assembled state. The base adapter 82 comprises mounting means 84 which form a positive-locking connection with the wiper blade adapter plate 78 in an assembled state. The detent means 80 engage thereby in detent recesses 86 of the base adapter 82 (FIG. 13). Said base adapter 82 is mounted via a further component (not depicted) to a wiper blade 76 (FIG. 14).

What is claimed is:

1. A wiper blade adapter for coupling to one type of wiper arm adapter (120) including an elongated hook-shaped base body (122) having a bend (124) of 180°, the wiper blade adapter comprising a coupling unit (10) which comprises at least one first coupling element (12) and a second coupling element (14), which include means for coupling to at least one other type of wiper arm adapter not having an elongated hook-shaped base body having a bend of 180°, and housing means (62) which are provided for delimiting at least one part of one of the coupling elements (12), characterized in that the housing means (62) and the one of the coupling elements (12) form one piece, wherein when the first and second coupling elements (12, 14) are coupled together the wiper blade adapter is able to receive the wiper arm adapter (120), and wherein the coupling unit (10) includes receiving and securing means for securing the coupling unit to the one type of wiper arm adapter after receiving the one type of wiper arm adapter during insertion of the one type of wiper arm adapter into the coupling unit in a single direction with an outside of the bend leading the insertion of the one type of wiper arm adapter.

2. The wiper blade adapter according to claim 1, characterized in that the first coupling element and the second coupling element (12, 14) are formed from separate components.

3. The wiper blade adapter according to claim 2, characterized in that the first coupling element and the second coupling element (12, 14) are detachable from one another.

4. The wiper blade adapter according to claim 1, characterized by a detent unit (16) which is provided to connect the first coupling element (12) to the second coupling element (14) via a detent connection.

5. The wiper blade adapter according to claim 1, characterized in that the first coupling element (12) has at least one longitudinal guide element (60) which is provided to guide the one type of wiper arm adapter during assembly.

6. The wiper blade adapter according to claim 1, characterized in that at least one of the coupling elements (12) has at least one detent means (56) which is provided to limit the one type of wiper arm adapter (120) in the freedom of movement thereof in an assembled state.

7. The wiper blade adapter according to claim 6, characterized in that the at least one detent means (56) is configured to be deflected along a direction transverse to a longitudinal direction (28) of one of the coupling elements (12, 14) during insertion of the one type of wiper arm adapter into the coupling unit, wherein the transverse direction is perpendicular to a vertical direction (26) and is configured to define an axis about which the bend (124) curves when the one type of wiper arm adapter (120) is secured to the coupling unit.

8. The wiper blade adapter according to claim 7, wherein the detent means is deflected out of a starting position transversely to the longitudinal direction and finally moves back into the starting position and engages behind the bend of the one type of wiper arm adapter after insertion of the one type of wiper arm adapter.

9. The wiper blade adapter according to claim 1, characterized in that the first coupling element (12) is configured to be mounted to a wiper blade adapter plate (78).

10. A wiper blade apparatus comprising one type of wiper arm adapter (120) including an elongated hook-shaped base body (122) having a bend (124) of 180°, and a wiper blade adapter including a coupling unit (10) having at least one first coupling element (12) and a second coupling element (14) with means for coupling to at least one other type of wiper arm adapter not having an elongated hook-shaped base body having a bend of 180°, and the coupling unit having housing means (62) delimiting at least one part of one of the coupling elements (12), wherein the housing means (62) and the one of the coupling elements (12) form one piece, wherein the first and second coupling elements (12, 14) are coupled together and the wiper arm adapter (120) is received within the first and second coupling elements (12, 14), and wherein the coupling unit (10) includes receiving and securing means for securing the coupling unit to the one type of wiper arm adapter after receiving the one type of wiper arm adapter during insertion of the one type of wiper arm adapter into the coupling unit in a single direction with an outside of the bend leading the insertion of the one type of wiper arm adapter.

11. The wiper blade apparatus according to claim 10, characterized in that the first coupling element and the second coupling element (12, 14) are formed from separate components.

12. The wiper blade apparatus according to claim 11, characterized in that the first coupling element and the second coupling element (12, 14) are detachable from one another.

13. The wiper blade apparatus according to claim 10, characterized by a detent unit (16) which is provided to connect the first coupling element (12) to the second coupling element (14) via a detent connection.

14. The wiper blade apparatus according to claim 10, characterized in that the first coupling element (12) has at least one longitudinal guide element (60) which is provided to guide the one type of wiper arm adapter during assembly.

15. The wiper blade apparatus according to claim 10, characterized in that at least one of the coupling elements (12) has at least one detent means (56) which is provided to limit the one type of wiper arm adapter (120) in the freedom of movement thereof in an assembled state.

16. The wiper blade apparatus according to claim 15, characterized in that the at least one detent means (56) is configured to be deflected transversely to a longitudinal direction (28) of one of the coupling elements (12, 14) during insertion of the one type of wiper arm adapter into the coupling unit.

17. The wiper blade apparatus according to claim 16, wherein the detent means is deflected out of a starting position transversely to the longitudinal direction and finally moves back into the starting position and engages behind the bend of the one type of wiper arm adapter after insertion of the one type of wiper arm adapter.

18. The wiper blade apparatus according to claim 10, characterized in that the first coupling element (12) is configured to be mounted to a wiper blade adapter plate (78).

19. A kit including the wiper blade apparatus according to claim 10, and further comprising the other type of wiper arm adapter, wherein the other type of wiper arm adapter is selected from a group consisting of a wiper arm adapter which includes a mounting pin and an L-shaped support plate that are separately spaced from one another and extend parallel to one another, and a wiper arm adapter which includes two rear stops and a mounting lug.

* * * * *